Oct. 13, 1964  J. H. KALK  3,152,848
DESK
Filed Aug. 25, 1961  3 Sheets-Sheet 2
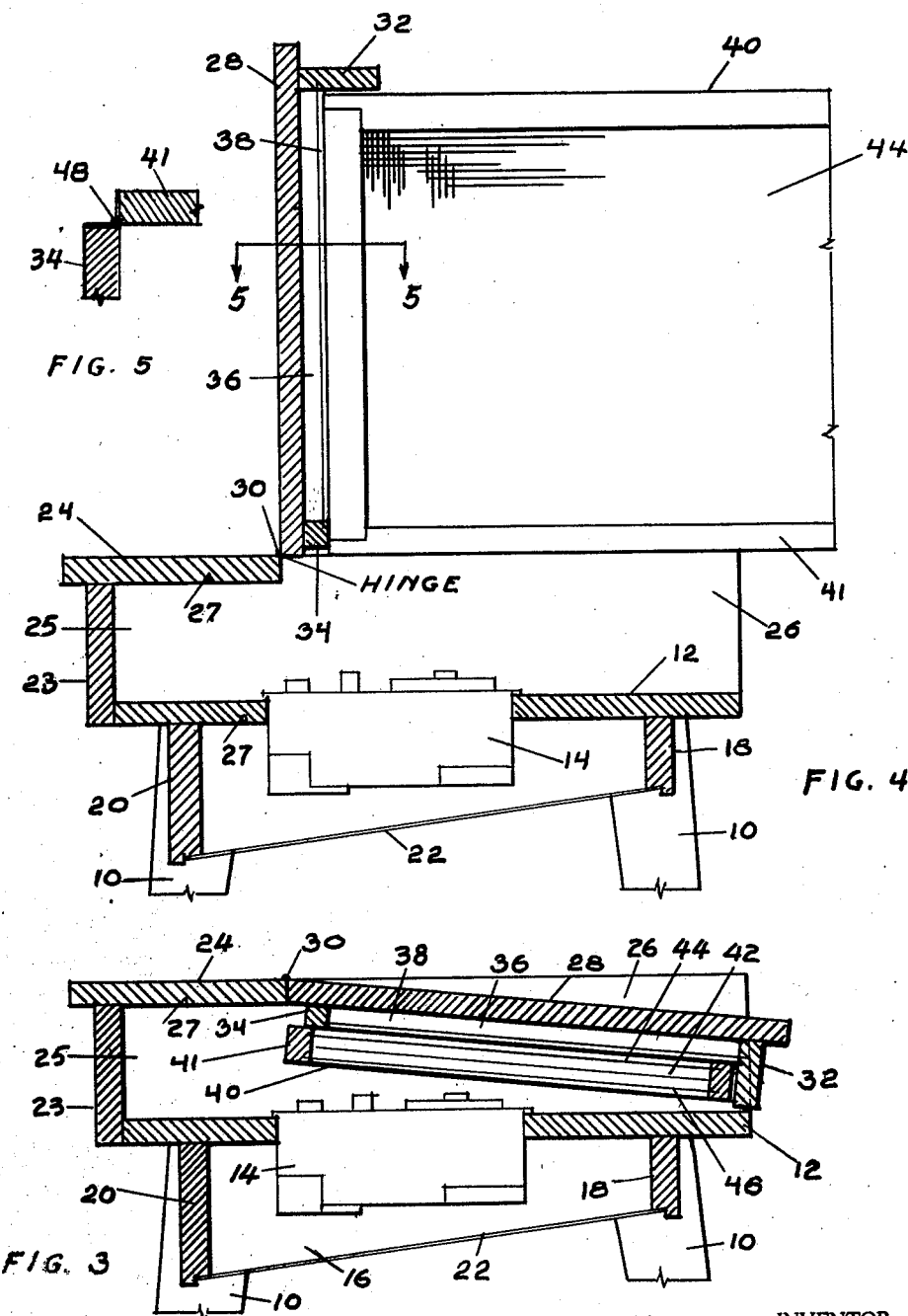
JOSEPH H. KALK INVENTOR.
BY L.H. PHELPS JR., ATT.

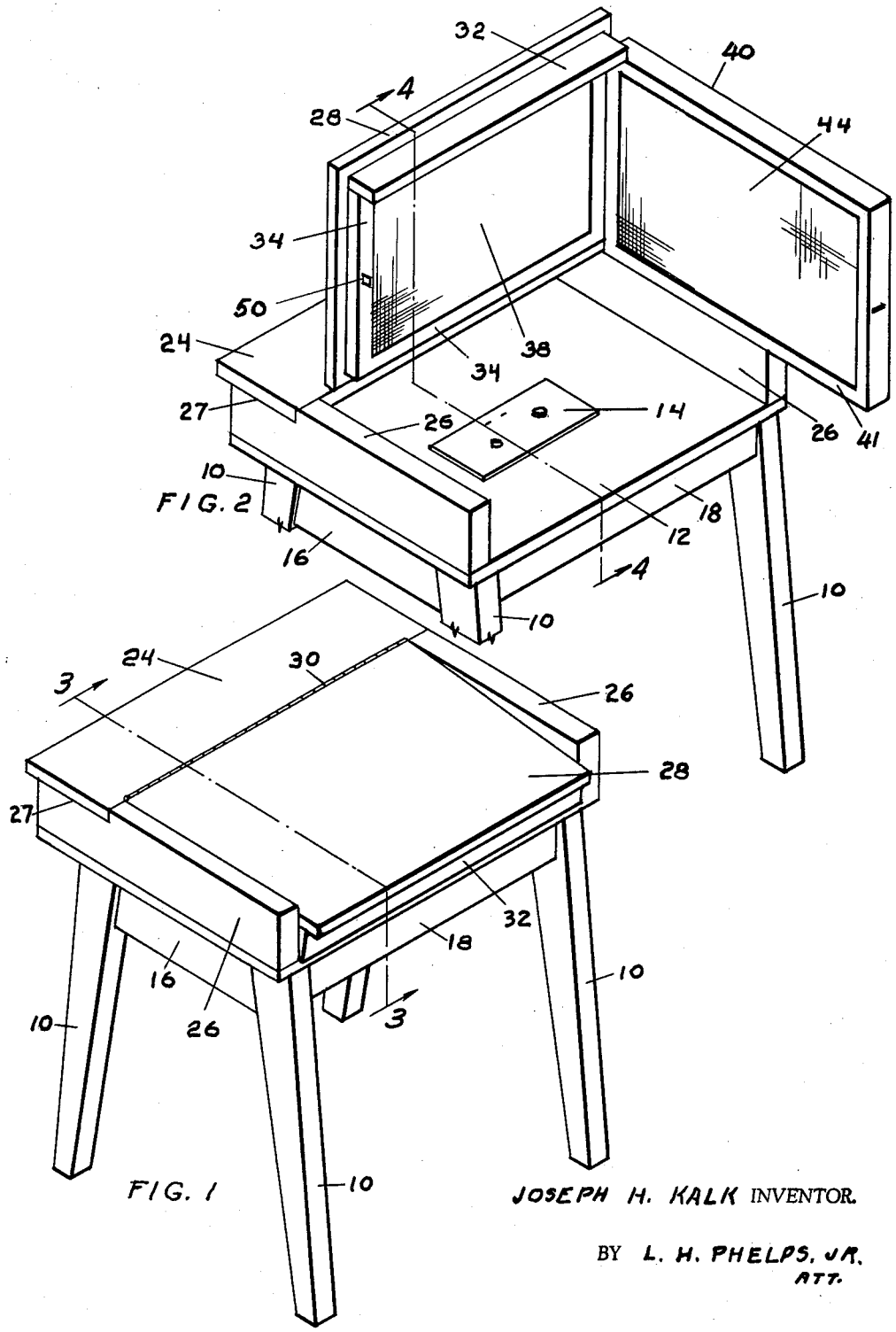

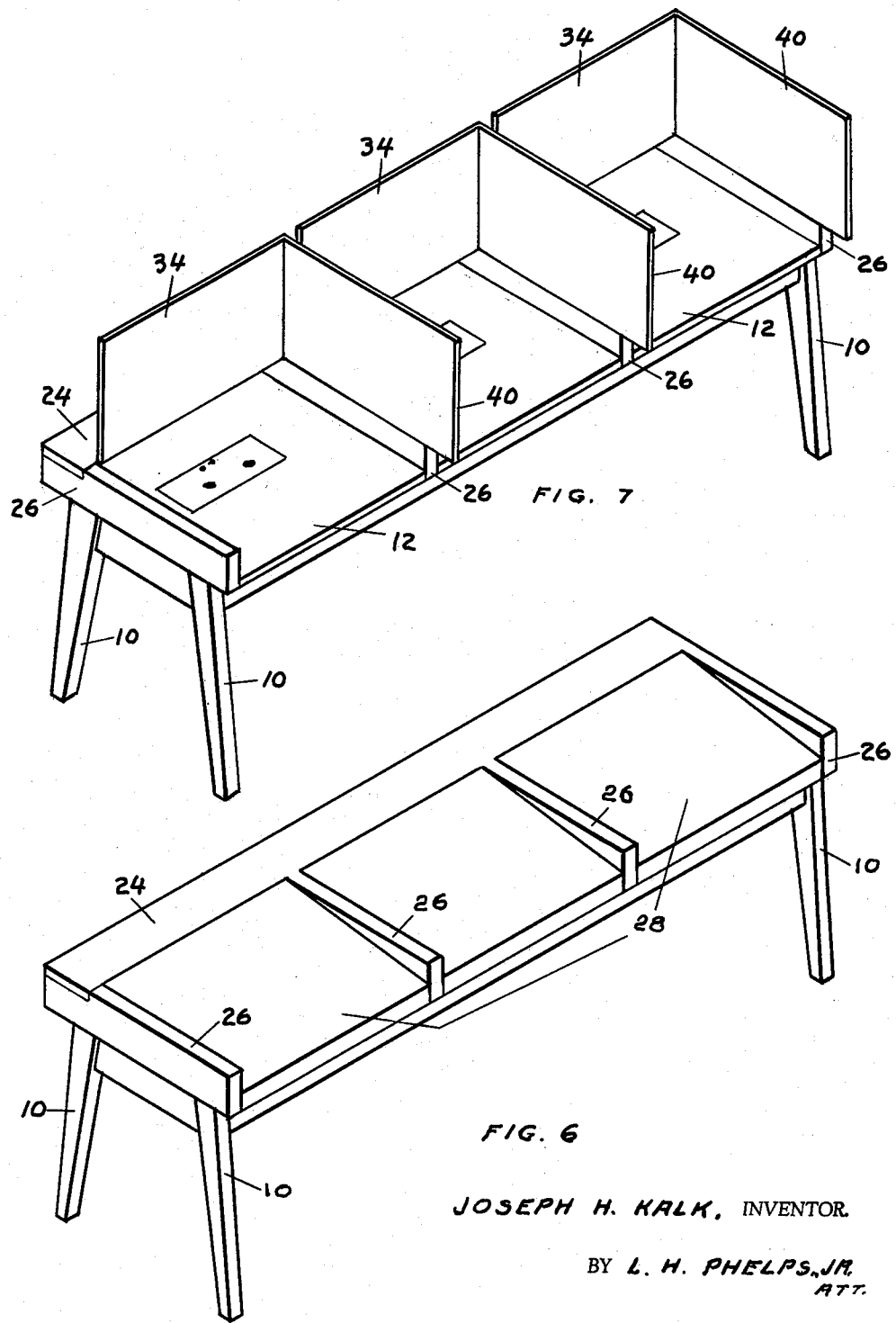

United States Patent Office 3,152,848
Patented Oct. 13, 1964

3,152,848
DESK
Joseph Howard Kalk, Upland Drive, Armonk, N.Y.
Filed Aug. 25, 1961, Ser. No. 133,953
11 Claims. (Cl. 312—241)

The present invention relates to teaching laboratory equipment and more particularly to a student laboratory station desk.

Heretofore teaching or language laboratory equipment has tended toward an organization of individual student stations, each comprising a table or desk having a work surface with upstanding sound proof partitions along its side and usually its rear margins, so that each student is provided with the privacy of an acoustically isolated work area. This, in turn, is provided with the usual electronic or electrical equipment for visual or audio instruction, recording, play back, communication and the like.

As a result of the obstruction formed by the upstanding panels or partitions, such an arrangement is unsuitable for conventional techniques of teaching, as for example general class discussions, lecture periods, demonstrations, group activities and other programs which normally require classrooms which are uninterrupted and unobstructed above desk top level. In an effort to avoid the restriction imposed by the limited function of usual teaching laboratory student stations, it has been proposed in some instances to omit the partition or panel which faces the student at the rear of the station desk. While this opens an avenue for direct colloquy between teacher and student the lateral panels still impair general class activities and the arrangement, overall, sacrifices a large part of the advantages of acoustical privacy.

In accordance with the present invention there is provided a dual purpose classroom desk with a substantially clear upper surface which is convertible at will into a language or teaching laboratory station. The desk top, or a substantial section thereof, is hinged along one margin so that it may be swung into vertical upstanding position, and carries on its undersurface a second partition or acoustical panel which is also hinged along a margin which extends at right angles to the first hinge. Therefore the second panel, when swung out to a position normal to the vertically upstanding desk top section, provides a two sided enclosure. With a modular arrangement of the desks in ordinary classroom style, the inner acoustical panel of the adjacent desk partitions off the open side so that each desk top becomes individually compartmented on the rear and sides.

Raising of the desk top section exposes a compartment therebelow providing a sub-work surface or shelf for supporting the teaching laboratory equipment. On the other hand, with the desk top in normal lowered position the arrangement provides a conventional type classroom desk surface with the teaching equipment enclosed in a protective storing compartment therebelow. Even with the desk top section and its associated, hinged panel in raised position the present desk preferably includes a recessed and protected compartment for accessory equipment, such as earphones, microphone and the like. Both the desk top in lowered position, and the inner language laboratory equipment shelf form work surfaces of convenient height for classroom work.

The invention will be more specifically understood by reference to the following drawings disclosing one preferred illustrative embodiment thereof, and in which—

FIG. 1 is a perspective view of a desk constructed in accordance with the present invention with the top down for general classroom work;

FIG. 2 is a perspective view of the desk shown in FIG. 1, with the top raised and the partitions erected arranged in electronic laboratory student station position;

FIG. 3 is a section taken on the line 3—3 of FIG. 1;

FIG. 4 is a section taken on the line 4—4 of FIG. 2;

FIG. 5 is a detailed fragmentary section taken on the line 5—5 of FIG. 4;

FIG. 6 is a diagrammatic perspective view of an alternative embodiment of the invention showing a multiple unit desk; and FIG. 7 is a diagrammatic prospective view showing only the partitions erected.

Referring to FIGS. 1 to 4, the desk comprises legs 10 supporting a sub-work surface or shelf 12 which may contain or support electrical, electronic or other teaching equipment as indicated diagrammatically by the reference numeral 14. The legs provide ample student legroom and are joined at their upper extremities by side strips or rails 16 and front and rear rails 18 and 20 respectively. These also provide protection for visual or audio equipment which may be mounted within the lower work panel 12 and may be enclosed at the bottom as indicated by panel 22.

The top surface of the desk as shown in FIG. 1 comprises a rear top section 24 mounted on side rails 26, which are recessed at 27 to receive the same, and a movable front top section 28 that is received between said side rails. A rear wall 23 is located at the rear edge of the shelf 12 and is connected to the side rails 26 and to the rear top section 24.

As indicated more clearly in FIGS. 3 and 4, the front section 28 is hinged to the rear section as at 30 so that it can be swung into vertical position as shown in FIGS. 2 and 4. In the lower position shown in FIGS. 1 and 3 the top section 28 is supported by a front, downwardly projecting rail 32 which rests on the lower shelf or partition 12. The top section 28 is preferably sound insulated on its inner surface by an acoustical panel, comprising in the present embodiment a rectangular frame 34 embracing and supporting a layer or batt 36 of sound insulating material such as glass fibers or the like. Layer 36 is provided with an outer facing 38 of perforated sheet aluminum or the like.

To the lateral margin of desk top section 28 is pivotally attached a second acoustical panel 40 comprising an outer frame 41 likewise embracing and supporting a layer or a batt 42 of acoustical absorbent comprising any conventional type of, preferably fibrous, sound deadening material. Enclosing sheets of light weight perforated material 44 and 46, such as perforated aluminum or formica or the like, confine the outer surfaces of the layer of sound proofing material 42.

The second or lower acoustical panel 40 is pivotally connected to the top section 28 along a lateral side margin, preferably, as shown, to the frame 34, by means of a continuous hinge 48 illustrated more specifically in FIG. 5. Moreover the hinge 48 is associated with a lateral margin of the top section 28, which extends from the rear margin associated with the first named hinge 30. In other words, the two hinges and the rear and lateral margins of the top 28 with which they are associated, are adjacent to one another and preferably disposed at substantially a right angle. Accordingly, the inner or lower panel 40 will rest securely against the lower acoustical face of the desk top 28 in lowered position and a snap catch 50 is preferably provided to hold the parts in this position. The lower edge of frame 41, FIG. 4, lies in a plane that intersects with the axis of the hinge 30. When the desk top section 28 is erected, and the panel 40 swung outwardly from the top section 28, as shown in FIGS. 2 and 4, the lower frame section 41 of panel 40 overlies and rests upon the upper edge of the adjacent upstanding side rail 26, thus supporting both panels in vertical position. Obviously other supporting means may be provided, such as a bracket or ledge on rail 26.

In conventional classroom use therefore the desk, in the closed position as illustrated by FIGS. 1 and 3, provides a convenient conventional desk top work surface and a classroom free from impedimenta and obstructions above desk top level. By simply raising the pivoted desk top section 28 into vertical position and swinging the lower panel 40 into forwardly extending position there results a lateral and rear partition arrangement which, together with the partition of the adjacent desk unit provides the acoustical privacy and seclusion necessary from a teaching laboratory operation standpoint.

It is important to note that the laterally extending side panel 40 in its elevated position, advantageously projects forwardly a substantial distance beyond the front margin of the working surface 12 of the desk, thereby furthering the objective of privacy. Moreover whether the partitions are in erected or lowered position the present arrangement provides a convenient recess storage space 25 inwardly of the rear wall 23 and between the fixed upper rear section 24 of the desk top and the underlying portion of the working surface 12, for the arrangement and storage of portable equipment such as earphones, microphones and the like. And as previously intimated, with the desk top 28 in its lowered position all of the equipment is enclosed and protected and where desired may be secured by the provision of conventional locking or latching means. This may, for example, be mounted between the rail 32 and the adjacent portion of the sub-work surface 12.

The multiple or group desk arrangements shown in FIGS. 6 and 7 follow, in general, the details of the structure previously described, and to this extent bear the same reference numerals. As indicated, each desk comprises a number of student stations mounted on a unitary supporting leg structure 10 with an individual desk area for each student. By combining individual student stations in this manner single rails or separators 26 suffice between the respective desk stations. Each student desk section is provided with an individual top section 28 hinged at its rear margin as at 30 and carrying at its lower surface the acoustical panel 40 which is connected thereto by a continuous hinge 48 along a lateral side margin of the hinged top section. As a result, with the top sections in normal writing position the panels 40 nest flatwise against these lower surfaces. When the top sections 34 are erected, and the panels 40 are swung into forwardly extending position they rest upon rails 26 and provide upstanding partitions along the lateral sides of adjacent desk sections, exposing the sub-work surface 12 and providing an acoustically secluded station.

It will be apparent that the foregoing embodiment may be modified variously in accordance with the present invention. For example, the desk or various portions thereof may be made of sheet metal or other convenient structural materials. For example, the side rails 26 may comprise vertical partitions of sheet metal formed over at their upper extremities to support the panels 40 in erected position. Furthermore it is within the contemplation of the invention to enlarge the desk top to cover the rails 26 in its lowered position or to include the entire desk top if desired. In such an embodiment the top is hinged adjacent its rear margin, preferably to the rear desk rail.

As indicated the desk top in its lowered position is preferably horizontally disposed although it may be, as indicated, inclined forwardly and downwardly to some extent for convenience.

Furthermore, if desired the hinged desk top section may be formed of transparent material where it becomes desirable to permit visibility in a forward direction. In such a case the lower panel 40 may still preferably comprise a layer of sound deadening material to provide lateral acoustical privacy.

Moreover, although not within the purview of the preferred embodiment of the invention the swingable top section of the desk may be hinged adjacent its lateral side margin instead of its rear margin so that the top in erected position forms a lateral partition. In such an embodiment the panel 40 is carried by a hinge along the rear margin of the desk top section so that with the top erected the panel 40 will swing to a position adjacent and parallel to the rear of the desk. This embodiment, however, sacrifices to some extent the lateral seclusion provided by the forward projection of the side partitions in the preferred embodiment.

From the foregoing it will be apparent that the desk provides a clear and uninterrupted desk top covering a sub-top or work surface 12 and carrying a secondary acoustical partition or panel 40 which normally nests flatwise against the lower surface of the top. At will, the desk is convertible into a laboratory student station by raising it to vertical position and swinging the panel forwardly at right angles thereto to form a lateral side partition. The enclosure thus formed exposes and makes available the work surface of the laboratory student station.

It is an important feature of the present invention that the front rail 32 is attached to the desk top section and moves upwardly therewith. As a result the front portion of the lower work surface or partition is unobstructed providing ready and convenient access to the working equipment.

I claim:

1. A dual purpose student classroom desk convertible to a teaching laboratory student station comprising a desk having a top and means including upright legs for supporting said top in spaced relation to a floor and to provide student leg-room therebeneath, a section at least of said desk top being hingedly connected to the desk top adjacent one margin thereof to swing into upwardly extending position, a flat panel hingedly connected to said swingable desk top section along a margin of said swingable desk top section intersecting said first named margin, to swing from a first position flatwise against the desk top section to a second position essentially normal thereto when the desk top section is in upstanding position and forming with the upstanding desk top section angularly disposed partitions providing a teaching laboratory student station; means releasably holding said panel in said first position while said desk top section is being moved from said first position to said upstanding position; and means to hold said panel in said upstanding position normal to said desk top section.

2. The desk as defined in claim 1 comprising a substantially horizontal sub-work surface spaced below the desk top when said desk top is in its lowered position and providing therebetween a compartment for teaching equipment which is accessible only upon raising of said desk top.

3. In a dual purpose student station desk for a teaching laboratory comprising a desk top overlying a compartment defined by side rails and a lower substantially horizontal partition adapted to retain student teaching laboratory language equipment, a portion at least of said desk top being hingedly mounted adjacent its rear margin to swing from desk top position between said side rails into upstanding position, an acoustical panel hingedly connected to said desk top for movement from a position where it lies flatwise against the lower surface of said desk top to a position where it projects forwardly from a lateral margin of said desk top when the desk top is in upstanding position, and means to hold said panel in said forwardly extending position comprising the top surface of one of the side rails.

4. A desk as defined in claim 3 wherein said acoustical panel is of slightly less length than said desk top and of much greater length than the width of said partition, whereby, in forwardly extending position said panel projects a substantial distance forwardly beyond the front of the desk.

5. In a dual purpose desk comprising a supported desk compartment having a lower work partition for receiving teaching laboratory equipment, a rear wall, upstanding side members and a desk top mounted thereon, said rear wall and side members providing a chamber to receive said teaching laboratory equipment, said desk top containing a relatively fixed rear section confronting said lower work partition and a forward section hinged thereto along its rear margin to swing from a generally horizontal position into an upwardly extending position to provide a rear partition of a teaching laboratory student station, a partition panel hinged along a lateral side margin of the forward desk top section to rest flatwise against the lower surface of said forward desk top section and swingable into forwardly extending position when the forward desk top section is in upwardly extending position, and means to hold said panel in such position, the rear portion of the compartment below the fixed rear section of the desk top further providing a recess for the storage of movable teaching equipment.

6. A desk as defined in claim 5, wherein the forward desk top section is received between the side rails when in its generally horizontal position.

7. A dual purpose student classroom desk convertible to a teaching laboratory student station, comprising a desk compartment including a substantially horizontal shelf or sub-work surface, an upright back wall, spaced upright rails, a substantially horizontal rear top section mounted upon said rails, a substantially horizontal front top section disposed between said rails, and a front wall adjacent the front margin of said front top section; a first hinge means connecting said front top section along its rear margin with said rear top section, the axis of said first hinge means lying substantially in the plane of the top edge of said rails; a first acoustic panel mounted on the lower face of said front top section; a second acoustic panel positioned in confronting relation to said first acoustic panel; a second hinge means connecting one side edge of said second acoustic panel with a corresponding side edge of said first acoustic panel, with one longitudinal edge of said second acoustic panel lying substantially in a plane passing through the axis of said first hinge means, said first and second hinge means being disposed at substantially right angles to each other, said second hinge means being located close to one of said rails, whereby when said front top section is swung from a substantially horizontal to a substantially vertical position, and said second acoustic panel is swung into a forwardly extending position substantially normal to said front top section, said one edge of said second acoustic panel will at least partially overlie said one rail to rest thereon.

8. A dual purpose student classroom desk convertible to a teaching laboratory student station, comprising: a desk top; a supporting structure for holding said desk top in substantially horizontal, desk top position, said supporting structure including legs providing student leg-room beneath said desk; means pivotally connecting said desk top with said supporting structure for pivotal movement to an erected upright position providing an upstanding partition; a substantially rectangular panel disposed in a plane generally parallel to the pane of said desk top; means connecting said panel with said desk top for pivotal movement upon an axis at substantially right angles to the pivotal axis of said desk top, to swing outwardly from the desk top over said supporting structure to an erected position substantially normal to said desk top when said desk top is in said upstanding position, thereby providing a second upstanding partition extending substantially normal to the upstanding desk top, said panel in its erected position extending forward to the front portion of said desk; and means associated with the supporting structure for engaging the lower edge of said panel when in said outwardly extending erected position, whereby to support said panel in said position, and to hold said panel and said desk top in their respective erected positions forming cooperating upstanding partitions.

9. A dual purpose student desk, convertible to a teaching laboratory student station, comprising: a supporting structure having a substantially horizontally disposed work surface fixedly attached thereto, said supporting structure including legs providing student leg-room beneath said work surface; a desk top panel; means pivotally connecting said desk top panel to said supporting structure for movement about an axis substantially parallel with the rear portion of said work surface for movement from a lowered substantially horizontal position overlying said work surface to a raised, upstanding position to provide a substantially vertical partition at the rear portion of said work surface; a generally rectangular partition panel having an inactive position wherein it is disposed between said desk top panel and said working surface; means pivotally mounting said partition panel for movement about an axis disposed substantially at right angles to the pivotal axis of said desk top panel, said partition panel being movable, after said desk top panel has been raised to upright position, to a position normal to said work surface and normal to said desk top panel; and means for holding said partition panel in said position normal to said work surface and normal to said desk top panel, said partition panel extending to the front portion of said desk.

10. A dual purpose student classroom desk convertible to a teaching laboratory student station, comprising: a desk compartment including a substantially horizontal shelf or subwork surface, an upright back wall, spaced upright side rails, a substantially horizontal top section disposed between said rails, and a front wall adjacent the front margin of said top section; a first hinge means connected with said top section along its rear edge and pivotally supporting the same, the axis of said first hinge means lying substantially in the plane of the top edge of said rails; a panel positioned in confronting relation to said top section; a second hinge means connecting one side edge of said panel to said top section, with one longitudinal edge of said panel lying substantially in a plane passing through the axis of said first hinge means, said first and second hinge means being disposed at substantially right angles to each other, said second hinge means being located close to one of said rails, whereby when said top section is swung from a substantially horizontal to a substantially vertical position, and said panel is swung into a forwardly extending position substantially normal to said top section, said one edge of said panel will at least partially overlie said one rail to rest thereon.

11. A dual purpose student classroom desk convertible to a teaching laboratory student station, comprising: means providing a substantially horizontal, flat work area; leg structure connected with said means to support said flat work area in spaced relation to a floor and to provide unobstructed student leg-room therebeneath; a rear panel raisable relative to said flat work area to provide a substantially vertical rear wall at the rear portion of said flat work area; a side panel; a hinge at one end of said side panel pivotally mounting said side panel on said rear panel, with said side panel being disposed in confronting relation to said rear panel when said side panel is in closed position, the axis of said hinge being disposed vertically when said rear panel is in raised position, whereby said side panel is swingable outwardly from said rear panel to a position substantially normal to said flat work area to provide an upstanding side wall at substantially right angles to said rear wall; means releasably holding the side panel in said confronting relation to said rear panel during raising and lowering of said rear panel from its closed position to its raised position; said side panel having a length almost as long as said rear panel and being substantially greater in length than the width of said flat work area so that the other or free end of said side panel projects to a point a substantial distance forwardly of said flat work area, whereby said side panel will isolate and ensure privacy of the work area on one side of said side panel relative to a similar work area, when such similar work area is disposed on the opposite side of said side panel.

References Cited in the file of this patent

UNITED STATES PATENTS

| | | |
|---|---|---|
| 103,958 | Arnaud | June 7, 1870 |
| 326,814 | Walsh | Sept. 22, 1885 |
| 993,588 | Donning | May 30, 1911 |
| 1,272,245 | Fitzgerald | July 9, 1918 |
| 2,614,571 | Turpin | Oct. 21, 1952 |
| 2,627,854 | Sava | Feb. 19, 1953 |
| 2,961,280 | Jentzen | Nov. 22, 1960 |
| 3,008,789 | Bradley | Nov. 14, 1961 |

OTHER REFERENCES

Washington Post Publication, "Electronic Language Teaching System Starts at G.U.," dated November 22, 1950.